April 23, 1940.  J. H. MUELLER  2,197,766
POURING SPOUT FOR MILK BOTTLES
Filed July 15, 1938
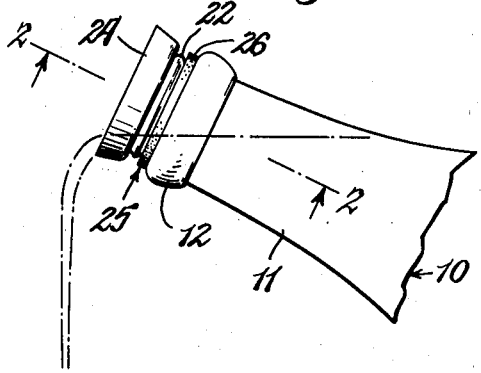
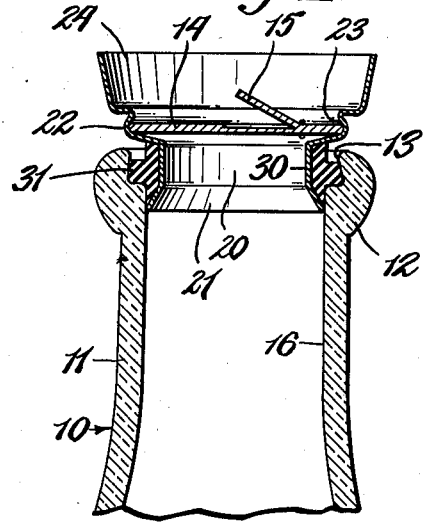
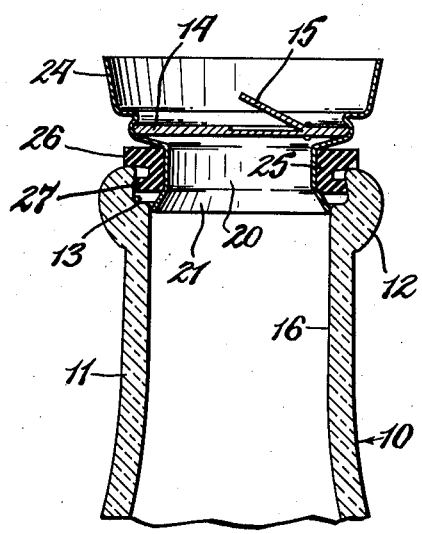
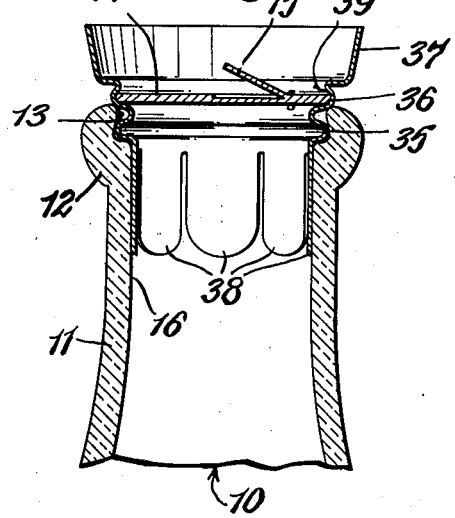
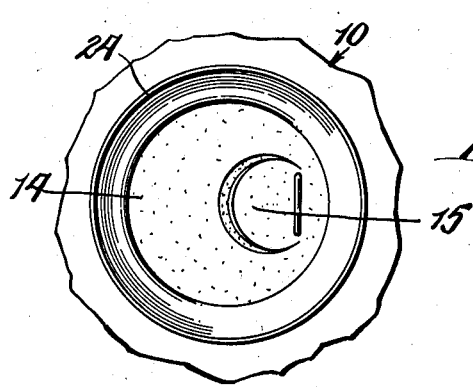
INVENTOR
John H. Mueller
BY
Popp and Popp
ATTORNEYS Patented Apr. 23, 1940

2,197,766

UNITED STATES PATENT OFFICE 2,197,766

POURING SPOUT FOR MILK BOTTLES

John H. Mueller, Buffalo, N. Y.

Application July 15, 1938, Serial No. 219,374

7 Claims. (Cl. 215—73)

This invention relates to a pouring spout for milk bottles and more particularly to such a spout which can be quickly applied to the neck of a milk or cream bottle and avoids the dribbling of milk down the side of the bottle, such as occurs in the normal use of a milk bottle.

One of the objects of this invention is to provide such a pouring spout which is very inexpensive in construction, thereby permitting it to be marketed as a premium in connection with the sale of milk.

Another object of the invention is to provide such a pouring spout which can be quickly applied to the neck of the milk bottle and when so applied prevents all leakage of milk except through the pouring spout.

Another object of the invention is to provide such a pouring spout which will receive the usual milk cap removed from the milk bottle, thereby enabling a partly emptied bottle to be closed by means of the cap originally supplied with the bottle. The pouring spout is so designed that when the cap is so applied the milk bottle can be inverted and shaken around without danger of loss of the milk either past the cap or around the pouring spout.

Another purpose of the invention is to provide such a pouring spout which can be readily kept in a clean and sanitary condition to avoid contamination of the milk and which can be readily used by housewives and children who are the principal consumers of milk.

In the accompanying drawing:

Fig. 1 is a fragmentary side view of a milk bottle having the preferred form of my pouring spout attached thereto and showing the manner in which the milk pours out of the bottle through the pouring spout.

Fig. 2 is a vertical section through the neck of a milk bottle having the preferred form of my spout applied thereto and showing the milk bottle cap removed from the bottle and applied to the spout to seal the remaining contents in the milk bottle.

Fig. 3 is a fragmentary top plan view of a milk bottle showing my preferred form of pouring spout atached thereto.

Figs. 4 and 5 are views similar to Fig. 2 showing modified forms of my invention.

A standard milk bottle is indicated at 10 which has the usual tapering and relatively broad neck 11 terminating in an enlarged rim 12, this rim being recessed as indicated at 13 to receive the usual cap 14. This cap can be of any usual and well known form, the cap shown being made of waxed paper and having a tab 15 which facilitates the removal of the cap from the milk bottle. It will be noted that the internal diameter 16 of the neck of the milk bottle is smaller than that of the annular recess 13 which receives the cap and is of substantially cylindrical form for a distance down from the recess 13.

In the normal use of the mlik bottle as shown, the milk can be readily poured out of the bottle, but because of the enlarged rim 12 of the bottle a small amount of the milk always dribbles over and down the side of the milk bottle following each pouring. The pouring spout forming the subject of my invention is designed to overcome this undesirable result.

The pouring spout is made of metal and is spun into the form illustrated. Any metal can be employed but it is preferable to employ a metal which can be readily spun into shape; which cannot readily be bent, thereby permitting thin sections to be employed; and which does not readily tarnish. In the form of the invention shown in Figs. 1-3 the spout is formed to provide a portion 20 which can be of cylindrical form and is of reduced diameter. Below this cylindrical portion 20 the pouring spout is flared out, as indicated at 21, the external diameter of the flaring out portion 21 exactly fitting the internal diameter 16 of the milk bottle. Above the portion 20 the tubular pouring spout is extended outwardly to form a bead 22 which, on the inside of the pouring spout, provides a channel 23 which snugly receives the cap 14 originally taken from the milk bottle. Above the bead 22 the spout is extended outwardly and flared to provide a pouring rim 24.

In order to retain the pouring spout within the neck of the milk bottle a rubber seal is provided. The preferred form of rubber seal shown in Figs. 1-3 comprises a rubber washer 25 snugly fitted around the central contracted portion 20 of the pouring spout and provided with two integral, outwardly extending flanges 26 and 27. The upper flange 26 is larger than the lower flange 27 and is arranged to rest on the end of the enlarged portion 12 of the milk bottle. The lower flange 27 is of smaller diameter and is of such size as to snugly fit within the recess 13 of the milk bottle.

In applying the form of the invention shown in Figs. 1-3 the milk bottle cap 14 is first removed from the milk bottle after which the pouring spout, with the rubber washer 25 attached, is pressed down into the neck of the milk bottle so that the flange 27 of the rubber washer snugly fits into the recess 13 which originally held the milk bottle cap and so that the other flange 26 of the rubber washer is sealed against the end of the milk bottle. In this position of the parts the lower flaring portion 21 of the pouring spout is snugly fitted into the cylindrical bore 16 of the milk bottle. The contents of the milk bottle can then be poured out, the milk flowing over the edge of the flaring rim 24 without dribbling back when the pouring is finished. At the same time no milk escapes into the space between the pouring spout and the rubber washer 25 inasmuch as the lower flaring portion 21 of the pouring spout prevents this. While the fit between this flaring portion 21 and the milk bottle is not one, of course, of extreme precision it has been found that this rim prevents the escape of milk against the underside of the rubber seal. At the same time the rubber seal positively holds the spout in position while pouring and further insures against the escape of milk. After the desired quantity of milk has been poured out, the remainder in the bottle can be sealed by the simple expedient of pressing the milk bottle cap 14 into its seat 23 in the pouring spout from which seat it can be removed and reinserted as occasion may require. After the milk bottle is completely emptied the pouring spout, together with its rubber washer 25, can be readily pulled out of the bottle and it and the bottle easily cleaned. However, while it is in position and after the cap 14 has been inserted in the channel 23, the milk bottle can be inverted and shaken without danger of either the spout or the milk bottle cap giving way.

The form of the invention shown in Fig. 4 is identical with that shown in Figs. 1-3 except that a modified form of rubber sealing washer is employed. The same reference numerals have therefore been employed designating the different portions of the pouring spout. The form of sealing washer shown in Fig. 4 includes a central portion 30 snugly fitted around the contracted portion 29 of the pouring spout and also the flaring portion 21 thereof and adapted to fit snugly within the cylindrical bore 16 of the milk bottle. This washer is provided with a readily extending flange 31 which fits into and seats against the recess 13 which is provided in the milk bottle for the reception of the usual cap 14. The form of rubber washer shown in Fig. 4 satisfactorily holds the pouring spout in position and is also satisfactory in preventing leakage but it is not so easily applied to the milk bottle as the two flanged form of sealing washer shown in Figs. 1-3.

The rubber sealing washer can be eliminated by providing a construction such as is illustrated in Fig. 5. In this form of the invention the tubular pouring spout is formed to provide a central reduced portion which in turn is formed to provide two outwardly extending beads 35 and 36, the upper bead 36 being of larger diameter than the lower bead 35. Above the upper bead 36 the tubular pouring spout is formed to provide an outwardly flaring rim 37 and below the bead 35 the pouring spout is formed to provide a plurality of spring fingers 38 which are adapted to be inserted into the cylindrical bore 16 of the milk bottle, these fingers pressing outwardly against the milk bottle and preventing accidental loss of the pouring spout. The lower bead 35 seats against the bottom and sides of the recess 13 in the milk bottle which normally receives the milk bottle cap. In addition the upper bead 36 fits against the end of the enlarged portion 12 of the milk bottle. It will therefore be seen that these two beads, in combination with the sealing effect of the spring fingers 38, provides an adequate seal against the accidental escape of milk while pouring from the spout and eliminates the necessity for a special rubber washer. In addition the upper bead 36 provides an internal channel 39 into which the milk bottle cap 14 can be fitted in the same manner as with the other forms of the invention.

From the foregoing it will be apparent that the present invention provides a very simple and inexpensive pouring spout for milk bottles which can be readily applied and removed from the milk bottle by children and forms a device to prevent the dribbling of milk down the neck of the bottle. The pouring spout also receives the cap removed from the milk bottle so as to prevent the contamination of the milk when only a part of the milk in the bottle has been poured out.

I claim as my invention:

1. In combination with a milk bottle and a cap therefor, said milk bottle having a tubular neck which is provided at its mouth with an internal annular recess, said recess being larger in diameter than the inside diameter of said neck adjacent said recess, and normally receiving said cap, a removable pouring spout, comprising a thin walled sheet metal tubular member having a central contracted portion, having an outwardly flaring rim at its upper end and having its lower end flared outwardly from said central contracted portion and adapted to fit snugly the inside of the neck of the milk bottle and provide a seal against the escape of liquid exteriorly of said spout and means embracing said central contracted portion only for retaining the lower end of said spout inside the neck of said milk bottle.

2. In combination with a milk bottle and a cap therefor, said milk bottle having a tubular neck which is provided at its mouth with an internal annular recess, said recess being larger in diameter than the inside diameter of said neck adjacent said recess, and normally receiving said cap, a removable pouring spout, comprising a thin walled sheet metal tubular member having a central contracted portion, having an outwardly flaring rim at its upper end and having its lower end flared outwardly from said central contracted portion and adapted to fit snugly the inside of the neck of the milk bottle and provide a seal against the escape of liquid exteriorly of said spout and means embracing said central contracted portion only for retaining the lower end of said spout inside the neck of said milk bottle, said spout being provided with an internal channel adapted to receive the removed cap from said milk bottle.

3. In combination with a milk bottle and a cap therefor, said milk bottle having a tubular neck which is provided at its mouth with an internal annular recess, said recess being larger in diameter than the inside diameter of said neck adjacent said recess, and normally receiving said cap, a removable pouring spout, comprising a thin walled tubular member having a central contracted portion, having an outwardly flaring rim at its upper end and having an outwardly flaring lower end adapted to fit snugly the inside of the neck of the milk bottle and provide a seal against the escape of liquid exteriorly of said spout and a resilient washer surrounding said contracted portion and snugly fitting said recess in the milk bottle which normally retains said cap thereon.

4. In combination with a milk bottle and a cap therefor, said milk bottle having a tubular neck which is provided at its mouth with an internal annular recess, said recess being larger in diameter than the inside diameter of said neck adjacent said recess, and normally receiving said cap, a removable pouring spout, comprising a thin walled tubular member having a central contracted portion, having an outwardly flaring rim at its upper end and having an outwardly flaring lower end adapted to fit snugly the inside of the neck of the milk bottle and provide a seal against the escape of liquid exteriorly of said spout and a resilient washer surrounding said contracted portion and having a radially outward extending flange snugly fitting said recess in the milk bottle which normally retains the cap thereon.

5. In combination with a milk bottle and a cap therefor, said milk bottle having a tubular neck which is provided at its mouth with an internal annular recess, said recess being larger in diameter than the inside diameter of said neck adjacent said recess, and normally receiving said cap, a removable pouring spout, comprising a thin walled tubular member having a central contracted portion, having an outwardly flaring rim at its upper end and having an outwardly flaring lower end adapted to fit snugly the inside of the neck of the milk bottle and provide a seal against the escape of liquid exteriorly of said spout and a resilient washer surrounding said contracted portion and having a pair of radially outward extending flanges the lower of which snugly fits said recess in the milk bottle which normally retains the cap thereon and the upper of which engages the upper end of the milk bottle.

6. In combination with a milk bottle and a cap therefor, said milk bottle having a tubular neck which is provided at its mouth with an internal annular recess, said recess being larger in diameter than the inside diameter of said neck adjacent said recess, and normally receiving said cap, a removable pouring spout, comprising a thin walled tubular member having a central contracted portion, having an outwardly flaring rim at its upper end and having an outwardly flaring lower end adapted to fit snugly the inside of the neck of the milk bottle and provide a seal against the escape of liquid exteriorly of said spout and a resilient washer surrounding said contracted portion and snugly fitting said recess in the milk bottle which normally retains the cap thereon, said spout being also provided between said contracted portion and flaring rim with an internal channel adapted to receive said cap after removal from said recess.

7. In combination with a milk bottle and a cap therefor, said milk bottle having a tubular neck which is provided at its mouth with an internal annular recess, said recess being larger in diameter than the inside diameter of said neck adjacent said recess, and normally receiving said cap, a removable pouring spout, comprising a thin walled tubular member having a central contracted portion, having an outwardly flaring rim at its upper end and having an outwardly flaring lower end adapted to fit snugly the inside of the neck of the milk bottle and provide a seal against the escape of liquid exteriorly of said spout and a resilient washer surrounding said contracted portion and snugly fitting said recess in the milk bottle which normally retains the cap thereon, said spout being also provided between said contracted portion and flaring rim with an external annular bead providing an internal channel adapted to tightly receive the cap removed from said recess, and said bead, in combination with said washer, limiting the movement of the pouring spout into the milk bottle.

JOHN H. MUELLER.